United States Patent
Tecu et al.

(10) Patent No.: US 7,224,383 B2
(45) Date of Patent: May 29, 2007

(54) MANIPULATING DIGITAL IMAGES BASED ON A USER PROFILE

(75) Inventors: Kirk S. Tecu, Longmont, CO (US); William R. Haas, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 10/340,382

(22) Filed: Jan. 9, 2003

(65) Prior Publication Data

US 2004/0135887 A1     Jul. 15, 2004

(51) Int. Cl.
*H04N 5/225*     (2006.01)
*H04N 9/04*     (2006.01)

(52) U.S. Cl. .............. 348/207.1; 348/207.11; 348/207.99

(58) Field of Classification Search ........... 348/14.03, 348/14.04, 207.1, 207.11, 207.2, 231.3, 231.6, 348/552; 345/581, 588, 600, 619
See application file for complete search history.

(56) References Cited

U.S. PATENT DOCUMENTS

| | | | |
|---|---|---|---|
| 5,479,206 A * | 12/1995 | Ueno et al. ............. | 348/211.5 |
| 5,943,093 A * | 8/1999 | Anderson et al. ........ | 348/231.6 |
| 6,480,202 B1 * | 11/2002 | Deguchi et al. ........... | 345/600 |
| 6,530,083 B1 * | 3/2003 | Liebenow .................... | 725/46 |
| 6,980,233 B1 * | 12/2005 | Hirasawa ................ | 348/207.1 |
| 2002/0051064 A1 * | 5/2002 | Koide ....................... | 348/231 |
| 2002/0054224 A1 * | 5/2002 | Wasula et al. ............. | 348/232 |
| 2002/0097433 A1 | 7/2002 | Chang et al. | |
| 2003/0030729 A1 * | 2/2003 | Prentice et al. ......... | 348/220.1 |
| 2003/0065590 A1 * | 4/2003 | Haeberli ..................... | 705/27 |
| 2003/0231248 A1 | 12/2003 | Gindele et al. | |

FOREIGN PATENT DOCUMENTS

JP     11232059     8/1999

OTHER PUBLICATIONS

Search Report Issued for GB0329663.9, dated May 13, 2004.

* cited by examiner

*Primary Examiner*—Vivek Srivastava
*Assistant Examiner*—Yogesh Aggarwal

(57) ABSTRACT

One embodiment of the present invention provides a method of applying user preferences to attributes associated with a digital image, comprising receiving a first digital image from an imaging device, updating attributes contained in a user profile based on user manipulations to the first digital image to create an updated user profile, and applying the attributes contained in the updated user profile to a second digital image.

6 Claims, 2 Drawing Sheets

MANIPULATING DIGITAL IMAGES BASED ON A USER PROFILE

FIELD OF THE INVENTION

The present invention relates generally to devices capable of acquiring digital images and, more specifically, to manipulating digital images based on a user profile.

DESCRIPTION OF RELATED ART

An imaging device is a device that acquires information, such as text or illustrations, printed or otherwise present, such as upon media, and transforms the information into a form suitable for computer or other data processing use. To read the information printed on media, the optical scanner may first digitize an image based on the media. Digitizing an image typically means dividing the image into a grid of boxes and representing each box with a numerical value (e.g., 0, 1 or 2) depending upon the depth of digitization and whether the box is filled in or not. The resulting matrix of bits, called a "bitmap," may be stored in a file, displayed on a computer screen, and/or manipulated by software programs (e.g., Optical Characterization Recognition (OCR) programs or photo-editing programs).

Many imaging devices use Charge-Coupled Device (CCD) arrays to digitize images. A CCD is an instrument with semiconductors connected so that the output of one semiconductor serves as the input of the next semiconductor. The CCD consists of tightly packed rows of light receptors that may detect variations in light intensity and frequency. Systems, such as digital cameras, video cameras, and/or scanners may use CCD arrays.

One type of imaging device is an optical scanner, such as a flatbed optical scanner. Similar to a photocopy machine, an optical scanner generally comprises a transparent surface or "platen", such as may comprise glass or plexiglass, against which a user may lay media to be scanned, such as books, magazines or other documents such as, paper, photos, negatives, and/or three-dimensional objects.

Imaging devices may also be included with devices that can print images onto media. For example, the HP All-In-One (AIO) device, available from the Hewlett Packard Company, contains both a flatbed scanner and a printer. The AIO device prints information scanned in by the scanner. Embodiments of the AIO device also include features that permit facsimile functions and copying.

A digital camera is another example of an imaging device that uses CCD arrays in acquiring digital images. A digital camera stores images digitally rather than recording the images on film. Attributes of stored images (pictures) may be downloaded to a computer, and then manipulated with a graphics program and printed. Attributes may include contrast, brightness, color and/or hue. For example, a picture of a nature setting may have been taken in low light conditions. To brighten the picture, after downloading the image to a computer a user may use an imaging program, such as ADOBE PHOTOSHOP or ADOBE ILLUSTRATOR to manipulate the image. These imaging programs contain many different manipulation tools, such as for manipulating the brightness, the contrast and the hue. Although image manipulation is generally performed on a single image, graphic programs may perform similar manipulations (e.g., lower contrast by 20%) on multiple images. For example, a specific brightness setting can be applied to multiple images, or a specific contrast setting can be applied to multiple images.

BRIEF SUMMARY OF THE INVENTION

One embodiment of the present invention provides a method of applying user preferences to attributes associated with a digital image. The method comprising receiving a first digital image from an imaging device, updating attributes contained in a user profile based on user manipulations to the first digital image to create an updated user profile, and applying the attributes contained in the updated user profile to a second digital image.

DETAILED DESCRIPTION

It should be appreciated that digital images, as used herein, include pictures, photographs, scanned media, facsimile images, recordings, movies, and/or other digital representations. Accordingly, embodiments may be operable with respect to any number of image devices including scanners, cameras, copiers, and/or the like.

Embodiments of the present invention provide a number of benefits over traditional methods of manipulating digital images. Providing feedback to a digital acquisition device enables the device to apply known user preference(s) to an image and automatically manipulate the image without requiring the user to use any intermediate imaging software, such as ADOBE PHOTOSHOP or ADOBE ILLUSTRATOR. In addition, using the device to manipulate digital images without user intervention may reduce the time a user spends manipulating images using a computer since an image will already have been manipulated before the image is downloaded to a computer. No additional "post processing" is required since all processing may occur at the time of acquisition. Using digital preferences also may improve digital image quality. The digital acquisition device may mechanically (e.g., using an F-stop, aperture or flash) manipulate the digital image. For example, in addition to digitally changing the brightness setting associated with the image, a digital acquisition device may also make an image brighter by directly overexposing the CCD. Using hardware to manipulate digital images may ultimately increase image quality without digital enhancements. Providing user preferences (feedback) to a device creates a closed loop system that may ultimately create digital images more pleasing to the user.

Figure 1:
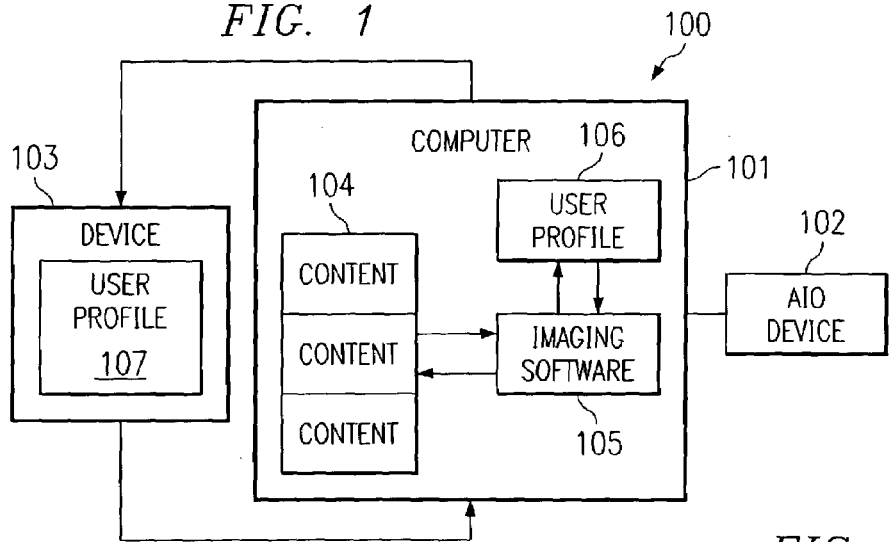
FIG. 1 is a block diagram of a data processing system suitable for practicing embodiments of the present invention.

FIG. 1 depicts data processing system 100 suitable for use with embodiments of the present invention. System 100 includes a number of devices, such as computer 101, AIO device 102 and acquisition device 103. Computer 101 communicates with AIO device 102 using an input/output port (not shown) on computer 101. For example, computer 101 may communicate with AIO device 102 through a parallel port. AIO device 102 may be used to print information (e.g. content 104) acquired by device 103 onto media, such as paper. AIO device 102 may also scan information contained on media, such as a photograph. To print, software may transmit print information to AIO device 102. Computer 101 may be used to manipulate digital images acquired by device 103 and/or AIO device 102.

Device 103 may be a device that acquires digital images, such as a digital camera or digital recorder. Device 103 transmits the acquired digital images to computer 101. The digital images may be placed in memory by computer 101, such as by storage as content queue 104. The digital images may be processed by software 105 based on a user profile 106. If a user profile does not exist (or if a user has modified an existing user profile), a new user profile (or modified profile) may be created and stored as user profile 106. Additionally or alternatively, the new (or modified) user profile may be transmitted to device 103 (or other imaging device useful with computer 101) by software 105 and/or computer 101, such as under control of a user thereof or automatically upon creation/alteration of a user profile, for storage as user profile 107. Once user profile 107 is stored in device 103, future digital images acquired by device 103 may be manipulated (if necessary) according to the new user profile. For example, a digital camera may increase exposure time of an image to create a brighter image if the user profile includes a user preference for brighter images based on previous manipulations.

Figure 2:
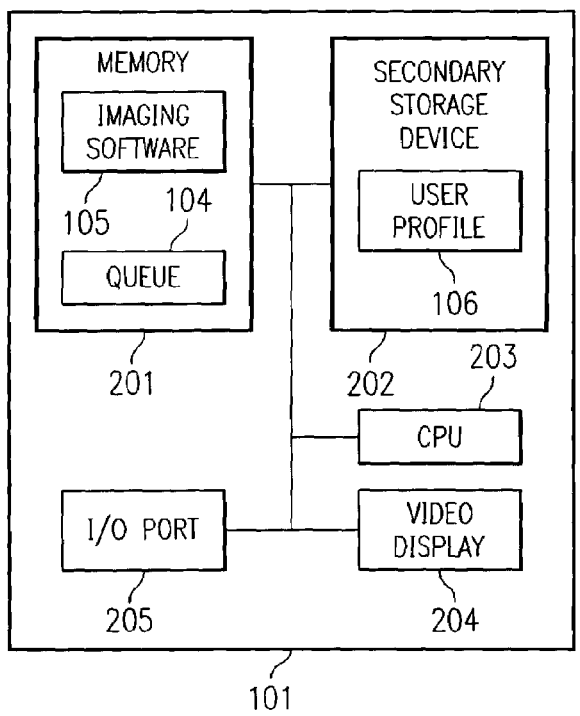
FIG. 2 is a block diagram of a computer according to an embodiment of the invention as depicted in FIG. 1.

FIG. 2 depicts a more detailed view of an embodiment of computer 101, that contains memory 201, secondary storage device 202, Central Processing Unit (CPU) 203, video display 204 and input/output port 205. Memory 201 of the illustrated embodiment stores software 105 and queue 104. Software 105 may be used to receive and/or manipulate digital images from device 103, determine user preferences based on image manipulations and transmit an updated user profile 106 to device 103. Queue 104 of the illustrated embodiment is an ordered holding region within memory 201 for digital images. For example, queue 104 may contain digital images in an order that software 105 manipulates the attributes associated with the digital images. Accordingly, queue 104 may be a First In First Out (FIFO) queue and the first digital image placed within queue 104 will have its attributes manipulated first. Manipulation of the digital images may take place in a same order that the images were placed within the queue.

Secondary storage device 202 contains user profile 106, although user profiles according to the present invention may be stored elsewhere, if desired. User profile 106 may contain a user's preference for digital images, such as contrast level, brightness level and color level. A plurality of such user profiles may be created, modified, and/or stored as computer 101, with each such profile containing a number of user preferences. In addition, each user profile may be associated with a specified profile name, such as "John outdoor," "Bob indoor" or "John camera viewfinder." For example, if user "John" prefers images more bright than dark, the user may have profile called "John bright" and if user "Bob" prefers images saturated with color, the user may have a profile called "Bob color." Each user may have multiple user profiles to use in multiple locations. For example, the profile "John camera viewfinder" may manipulate attributes associated with digital images displayed on a viewfinder associated with device 103. At least one of these user profiles may be transmitted to device 103 so that acquired digital images may be manipulated according to the user profile in real-time.

Input/output port 205 of the illustrated embodiment may be utilized to transmit information and receive information from AIO device 102 (e.g., print instructions) and device 103 (e.g., user preferences and digital images). Input/output port 205 may be a RS-232 serial port, bi-directional IEEE 1388 compliant port, such as a parallel port or a Universal Serial Bus (USB) port, a wireless interface, such as an IEEE 802.11 compliant port, a network interface, or the like. Although aspects of software 105 are described as being stored in memory, note that these aspects may be stored on, or read from, a computer's readable media, such as secondary storage devices, like hard disks, floppy disks, and CD-ROM; a carrier wave received from a network like the Internet; other forms of Read Only Memory (ROM) or Random Access Memory (RAM), or other known or later to be developed devices.

Figure 3:
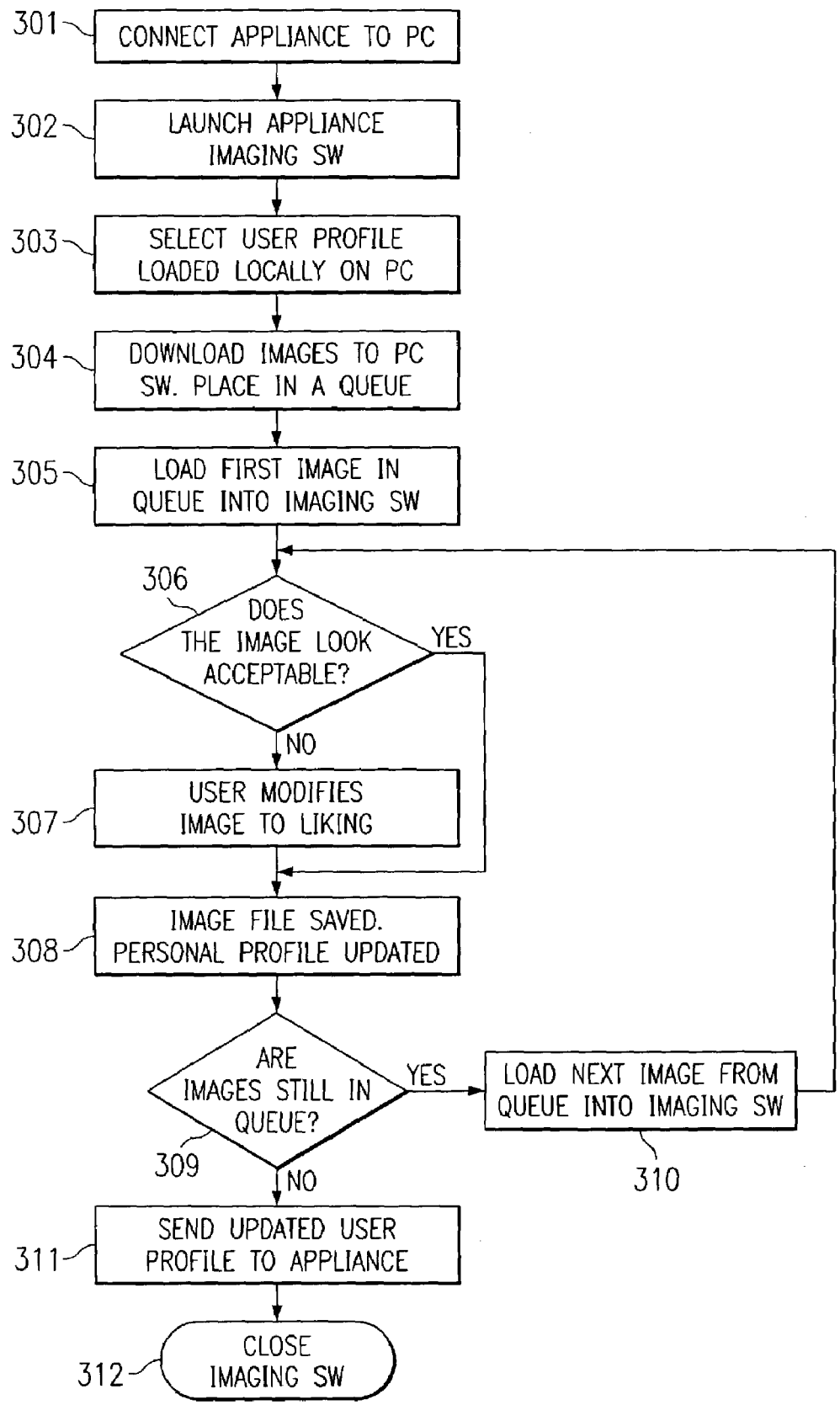
FIG. 3 is a flow chart applying user preferences to digital images consistent with the present invention.

FIG. 3 is a flow chart illustrating a method for applying user preferences to digital images consistent with embodiments described herein. In block 301, a user may connect device 103 to computer 101. Device 103 may be connected to computer 101 via input/output port 205, such as a USB port or serial port or wireless connection. In block 302, software 105 may be initiated on computer 101 once device 103 is connected to computer 101. For example, software 105 may be initiated by double-clicking on an icon associated with software 105 located on an operating system desktop. Note that software 105 may be automatically initiated once computer 101 detects that device 103 has been connected to port 205.

Once initiated, in block 303 software 105, and/or user thereof, selects a user profile 106 contained within secondary storage device 202. Secondary storage device 202 may contain multiple user profiles. In block 304, software 105 may transfer digital images that have not yet been manipulated from device 103 to computer 101 and place the transmitted images in queue 104. By placing the digital images within queue 104, software 105 may manipulate the digital images, based on user profile 106. Image manipulation may be performed by software 105 before an updated user profile (or other feedback) is transmitted to device 103. In block 305, a digital image is transferred from queue 104 to software 105.

Once transferred, a user may determine (block 306) whether the digital image is acceptable. If the digital image is acceptable, in block 308 the digital image is saved in secondary storage device 202 as an image file and user profile 106 may be updated. For example, user profile 106 may be updated to reflect the fact that the digital image is acceptable without manipulation. If the digital image is not acceptable, in block 307 the user may manipulate the digital image using software 105. For example, if the digital image is a photograph, a user using an imaging program may alter the brightness, contrast, color and size of the image. To do so, a user may use slider bars, enter percentage changes, or implement other techniques for selection.

Once the user has finished manipulating the digital image, software 105 determines (block 309) whether any additional digital images remains in queue 104. If digital images remains in queue 104, in block 310 software 105 transfers a next image from queue 104 to software 105. Blocks 306 through 310 repeat until all digital images have been processed (e.g., manipulated and saved) from queue 104.

Once all digital images has been saved on secondary storage device 202, in block 311 software 105 updates user profile 106 to indicate which image manipulations the user performed (or did not perform) and transmit an updated user profile 106 to device 103 for storage therein as user profile

107. For example, software 105 may use an algorithm, such as a weighted average algorithm (described below) to determine the extent the user deviated from user profile 106.

After user profile 106 is updated, updated user profile 106 is transmitted to device 103 and in block 312, and software 105 may be closed. User profile 107 may be stored in memory associated with device 103, such as a Non-Volatile Random Access Memory (NVRAM). Note that user profile 106 may also be stored in a file associated with software 105. Once a new user profile is stored within device 103, digital images acquired from device 103 may automatically be manipulated using user profile 107 at the time an image is acquired and/or at the time the digital image is displayed. That is, depending upon which user profile 107 is stored, and/or active, in device 103. For example, if a user profile named "Joe's bright viewfinder" is transferred to device 103, digital images displayed on a viewfinder associated with device 103 may appear brighter, such as by the viewfinder algorithms applying image rendering techniques for auto image brightening consistent with the user profile. Additionally or alternatively, if a user profile named "Joe's bright images" is transferred to device 103, digital images acquired by device 103 may be captured in such a way as to increase the brightness thereof consistent with the user profile, such as by the image acquisition algorithms applying image capturing techniques for auto image brightening consistent with the user profile. Note that updated user profile 106 may be transferred to other devices and/or locations, such as electronic whiteboards, electronic mail, printers or other devices capable of acquiring and/or displaying digital images.

For example using the weighted average algorithm, a user may create a user profile and acquire ten digital images using device 103. Using software 105, the user may adjust the brightness of these ten digital images on average 50% brighter than default brightness value of device 103. The value for the new (and now current) brightness level (e.g., "BLcurrent") and the value for the number of digital images taken (e.g., "SHOTScurrent") are preferably saved in a user profile, such as user profile 106 and/or user profile 107. The user may next, for example, take five additional digital images using device 103, such as may be acquired using user profile 107 updated to include the new and now current brightness level, BLcurrent, and value for the number of digital images taken, SHOTScurrent. The user may further adjust the brightness level for the new set of five digital images. The user, on average, sets the brightness (e.g., "BLnew") for the additional five digital images (e.g., "SHOTSnew") 25% brighter than the current brightness level and 187.5% brighter than the default brightness value of device 103 (e.g., 125%*150%=187.5%). The new user preferences may be calculated by a weighted average algorithm:

$$[(BLcurrent*SHOTScurrent)+(BLnew*SHOTSnew)]/(SHOTScurrent+SHOTSnew)=BLcalculated.$$

In this example, the values are: [(150%*10)+(187.5%*5)]/(10+5)=162.5%. The new value of BLcurrent may be "162.5%" and the new value of SHOTScurrent may be "15." The new BLcurrent and SHOTScurrent values are preferably stored in a user profile, such as user profile 106 and/or user profile 107.

In another example using software 105, computer 101 may apply user preferences to a digital image acquired from a scanning device, such as an AIO device 102. For example, a digital image scanned by AIO device 102 may be too bright. Using user profile 106, software 105 may reduce the brightness by a set amount (e.g., 50 percent).

Figure 4:
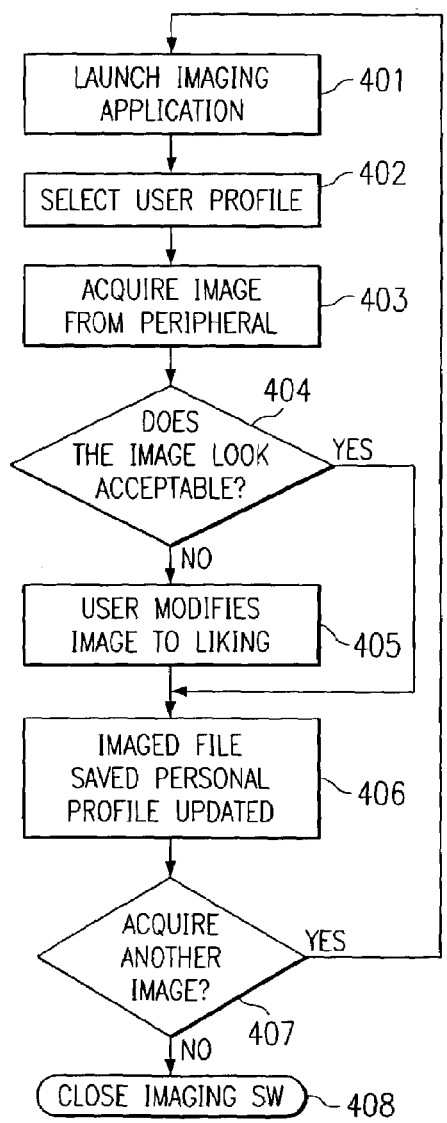
FIG. 4 is a flow chart illustrating an embodiment of a method for applying user preferences to images acquired from a digital acquisition device consistent with the present invention.

FIG. 4 is a flow chart illustrating a second embodiment when applying user preferences to images acquired from an imaging device, such as a scanner. In block 401, software 105 is initiated. For example, a user may "double-click" an icon associated with software 105. In block 402, software 105, and/or a user thereof, selects user profile 106 from secondary storage device 202 and/or a user profile stored in association with the imaging device. Note that user profile 106 may be among multiple user profiles stored in secondary storage device 202.

Next in block 403, software 105 acquires an image from AIO device 102. Once acquired, software 105 may manipulate the acquired image based upon preferences stored within user profile 106. The user determines (block 404) whether the acquired image is acceptable. If the image is acceptable, in block 406 the image may be saved in secondary storage device 202 and user profile 106 may be updated. For example, user profile 106 may be updated to indicate that the user did not manipulate the image or to change the stored profile in accordance with preference changes made by the user. User profile 106 may be stored in a file (not shown) associated with software 105. Note that user profile 106 may also be stored in a memory (not shown) associated with AIO device 102, such as a NVRAM. If the image is not acceptable, in block 405 the user may manipulate the image. Once the image is acceptable, in block 407 the user may acquire additional images and manipulate the images by repeating blocks 404 and 405. Once all images have been acquired, in block 408 software 105 may be closed.

The invention claimed is:

1. A method, comprising:
    storing a user profile in an imaging device;
    acquiring a first digital image with the imaging device using the stored user profile;
    manipulating the first digital image to create a manipulated first digital image;
    updating the user profile based on user manipulations to the manipulated first digital image to create an updated user profile, wherein updating the user profile further comprises calculating a weighted average of user manipulations with respect to digital images including the first digital image; and
    acquiring a subsequent digital image with the imaging device using the updated user profile.

2. The method of claim 1 wherein storing a user profile further comprises storing a plurality of user profiles associated with multiple users of said imaging device.

3. The method of claim 1 wherein storing a user profile further comprises storing a plurality of user profiles for use with respect to multiple locations.

4. The method of claim 1 further comprising:
    transferring the updated user profile to another imaging device adapted to acquire a digital image.

5. The method of claim 4 wherein said image device comprises one of a camera, a scanner, and a copier and said another imaging device comprises a different one of a camera, a scanner, and a copier.

6. A method, comprising:
    storing a user profile in an imaging device;
    acquiring a first digital image with the imaging device using the stored user profile;
    manipulating the first digital image to create a manipulated first digital image;

updating the user profile based on user manipulations to the manipulated first digital image to create an updated user profile, wherein updating the user profile further comprises calculating a weighted average of user manipulations with respect to digital images including the first digital image, wherein said weighted average determines an extent a user deviated from the stored user profile; and acquiring a subsequent digital image with the imaging device using the updated user profile.

* * * * *

UNITED STATES PATENT AND TRADEMARK OFFICE
CERTIFICATE OF CORRECTION

| | | |
|---|---|---|
| PATENT NO. | : 7,224,383 B2 | Page 1 of 1 |
| APPLICATION NO. | : 10/340382 | |
| DATED | : May 29, 2007 | |
| INVENTOR(S) | : Kirk S. Tecu et al. | |

It is certified that error appears in the above-identified patent and that said Letters Patent is hereby corrected as shown below:

On the Title page, in item (56), under "U.S. Patent Documents", in column 2, line 10, delete "2003/0231248" and insert -- 2003/0231246 --, therefor.

Signed and Sealed this

Nineteenth Day of May, 2009

JOHN DOLL
*Acting Director of the United States Patent and Trademark Office*